Patented Oct. 30, 1945

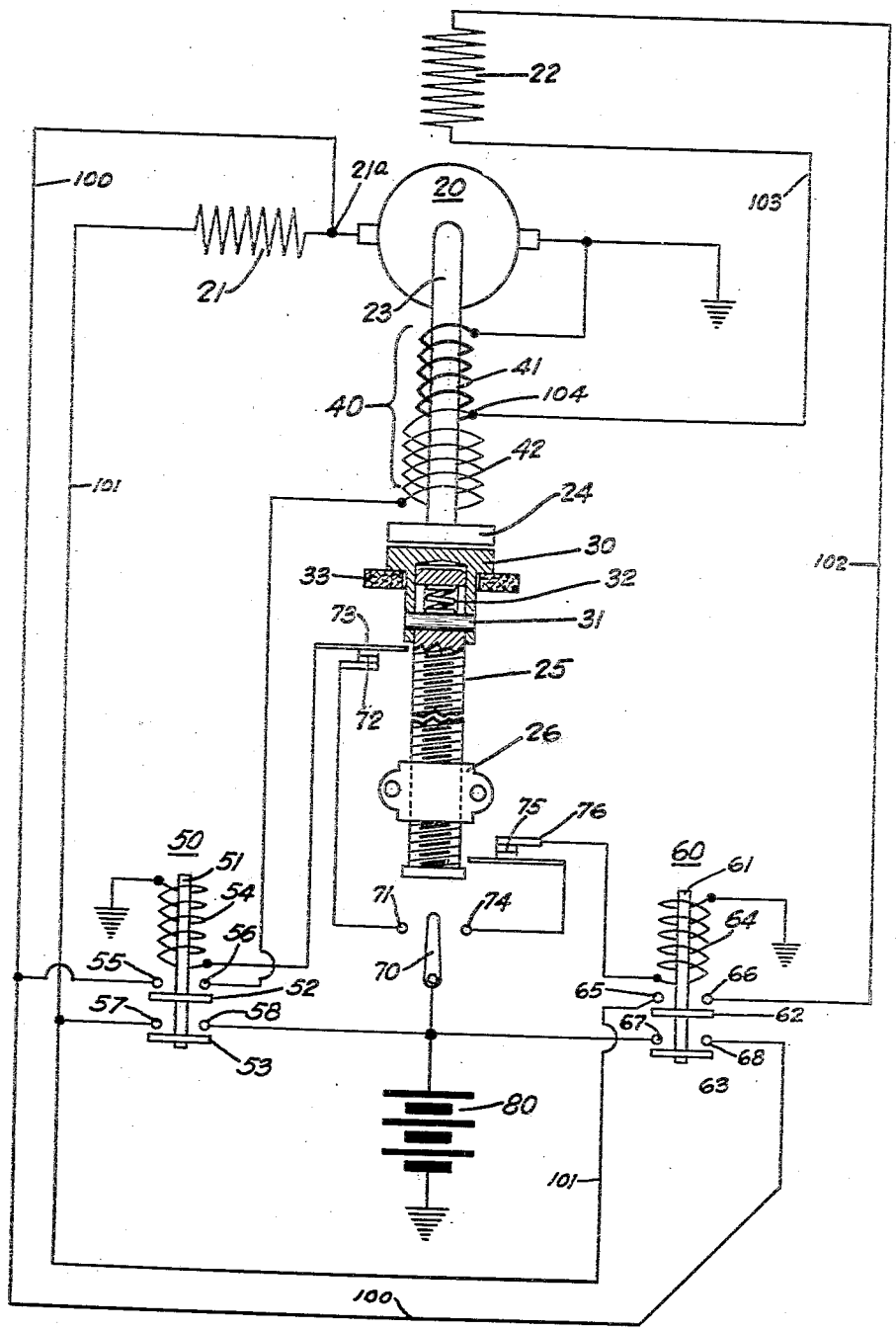

2,387,799

UNITED STATES PATENT OFFICE 2,387,799

MOTOR CONTROL

Robert William Leland, Dayton, Ohio, assignor to General Motors Corporation, Detroit, Mich., a corporation of Delaware Application April 3, 1944, Serial No. 529,249

4 Claims. (Cl. 172—239)

This invention relates to improvements in electrically operated load lifting devices and their controls.

It is among the objects of the present invention to provide a load lifting device having an electric motor as prime mover for a work shaft which, when the electric motor is inactive, is disconnected therefrom and held against rotation but which, when the motor is energized, is operatively connected to the motor so as to be rotated thereby.

A further object of the present invention is to provide control mechanism for a load lifting device comprising a work shaft driven by an electric motor and electromagnet clutch, said mechanism, in one instance, connecting a source of electric power with the electric motor and electromagnet clutch to effect motor operation as a powerful series motor and connection with the work shaft for driving said shaft in the load lifting direction, and in another instance to effect motor operation as a shunt motor and connection with the work shaft for driving it in the load lowering direction.

Further objects and advantages of the present invention will be apparent from the following description, reference being had to the accompanying drawing, wherein a preferred embodiment of the invention is clearly shown.

In the drawing, which comprises a single view diagrammatically illustrating the present invention, the electric motor is designated by the numeral 20. This motor has an armature circuit and also two field windings, one winding being designated by the numeral 21, the other by the numeral 22. The motor shaft 23 has a driving disc 24 secured therein in any suitable manner.

The shaft to be driven is shown as a screw shaft 25 having a traveling nut 26 threadedly engaging it. This nut 26 is adapted to support the load to be raised and lowered by the device. The load, not shown by the present drawing, may be of any suitable nature, as for instance the landing gear of an airplane or the bomb-bay doors of a military bombing plane.

Shaft 25 has a coupling member 30 secured thereto by a pin 31 so that the coupling member and shaft must rotate together, but the coupling member may move longitudinally relatively to the shaft. The arrangement is such that the outer end surface of the coupling member coaxially aligns with and is in juxtaposition to the driving disc 24. Any suitable spring 32 exerts a force to urge the coupling member 30 away from the driving disc 24 into gripping engagement with a friction or brake ring 33 so as normally to hold the shaft 25 against rotation particularly when the traveling nut 26 is at the end of shaft 25 adjacent the coupling 30 and the load on the nut tends to exert a force to turn the shaft 25 through nut 26.

An electromagnetic clutch is shown comprising a magnet winding 40 which, when in circuit with the source of power, energizes the driving disc 24 to magnetize it whereby the coupling member 30 will be attracted to move from the brake ring 33 into operative engagement with the driving disc. In the apparatus as illustrated, winding 40 is shown to consist of two sections 41 and 42, connected in series by the juncture 104, the section 41 being of heavy wire and the section 42 of a comparatively lighter wire so that the latter offers greater resistance to current flow than section 41. This is done to assure a constant clutch effect when the motor is functioning as a series motor or as a shunt motor for, when acting as a series motor, the field 21 is connected in series with the entire winding 40, however, when acting as a shunt motor, both fields 21 and 22 are connected in series with only the section 41 of winding 40, section 42 being out of circuit under this circumstance to compensate for the resistance offered by both motor fields. This maintains the clutching effect of the magnetic clutch substantially constant under both conditions. Under some circumstances winding 40 may be wound of one size wire and at other times sections 41 and 42 thereof may be of the same or different sized wire, but of a different number of convolutions respectively.

Two circuit controlling devices 50 and 60 control the operation of the electric motor, these circuit controlling devices being rendered effective by the operation of a selector switch 70 connected in circuit with a source of electric power shown to be a storage battery 80.

The control device 50 is an electromagnet switch having a solenoid armature 51 carrying bridging contacts 52 and 53. A solenoid magnet winding 54, when energized, moves the solenoid magnet 51 from normal circuit open position into a circuit closing position in which bridging element 52 of the switch engages contacts 55 and 56, and bridging element 53 engages contacts 57 and 58. The similar circuit control device 60 has a solenoid magnet 61 provided with a winding 64 for moving it into circuit closing position whereby bridging element 62 engages stationary contacts 65 and 66 and bridging element 63 engages stationary contacts 67 and 68.

The selector switch 70 may be moved into engagement with the stationary contact 71 to connect the storage battery 80 with the normally engaging contacts 72 of the up-limit switch 73 connected in circuit with the magnet winding 54 of the circuit controller 50. It may also be moved into engagement with the stationary contact 74 which is connected with contacts 75 of the down-limit switch 76 in circuit with the magnet winding 64 of the circuit controller 60.

The device of the present invention is a load lifting mechanism and has an electric motor 20 as its prime mover. The electric motor 20 operates as a powerful series motor when turning the screw shaft 25 in the one direction so that the traveling nut 26 thereon will move upwardly to lift the load. This same motor 20 operates as a shunt motor to turn the screw shaft 25 in the opposite direction so that the nut 26 moves downwardly thereon to lower the load. The tendency of the load on the nut is to cause the nut to drive the shaft 25 at an increasing speed as it moves downwardly on said shaft. The motor when acting as a shunt motor, if driven by the traveling nut 26 through the shaft 25, coupling 30 and motor shaft 23 at an excessive speed will, when reaching a predetermined speed, function as a generator, setting up a counterelectromotive force within the motor, tending to retard the movement of the electric motor and thus maintaining it within a predetermined safe operating speed.

With all the elements of the apparatus in operative position, if the operator wishes to cause the motor 20 to operate so that the shaft 25 is turned to raise the nut 26 and lift the load, he operates the selector switch 70 so that it will engage the stationary contact 71. Now current from the storage battery may flow through switch 70, its contact 71 across contacts 72 of limit switch 73 through the electromagnet winding 54 back to the battery via ground connections. Energization of the magnet winding 54 will cause the solenoid magnet 51 to be attracted and moved upwardly so that bridging elements 52 and 53 engage their respective stationary contacts. Now current from the storage battery 80 flows to stationary contact 58 across bridging member 53 to stationary contact 57 thence to the field winding 21 across the armature circuit of the motor 20 to the ground and back to the battery. Current will also flow from the field circuit 21 at point 21a through the wire 100 to the stationary contact 55 of the circuit controller 50 across the bridging element 52 to the stationary contact 56 thence through the connected fine and heavy winding convolutions 42 and 41 of the magnet winding 40 of the electromagnet back to the battery via the ground connections.

With the above circuits completed it will be seen that the motor connections are completed to cause the motor 20 to function as a series motor and at the same time the elecromagnet windings 40 of the electromagnet are energized to magnetize the driving disc 24 of the motor 20. With the energization of the driving disc 24, coupling 30 on shaft 25 will be drawn into operative engagement with said disc and out of gripping engagement with the brake ring 33. As the coupling 30 engages the driving disc 24, now being rotated by the series motor 20, the shaft 25 will be rotated so that the nut 26 will start its upward movement. As the nut moves upwardly it will disengage switch 76, normally engaged and opened by the nut at its bottom position, and as soon as the nut reaches a predetermined position in its movement upwardly, it will engage the limit switch 73 to separate contacts 72, thereby breaking the circuit through the circuit controller 50, causing its deenergization and a resultant opening of the switch, which discontinues the motor and electromagnet circuits, thereby rendering both of them inactive. Thus the motor will stop at this predetermined point and the coupling 30 will again be moved out of operative engagement with the driving disc 24 and into gripping engagement with the brake ring 33 to hold the shaft 25 against rotation particularly under the effect of the load upon the nut 26.

It will be seen from the above that the entire resistance of both windings 41 and 42 of the electromagnet winding assembly 40 is introduced in circuit with the series field winding 21 of the electric motor 20 as it operates as a series motor. These windings 41 and 42 and 21 are relatively so designed that the electric motor 20 operates at a predetermined speed as a powerful series motor to turn the screw shaft 25 for purposes of lifting a comparatively heavy load such as the landing gear of an airplane or the like.

To lower the load the operator actuates the selector switch 70 into its other circuit closing position so that it engages contact 74 whereby a circuit through the electromagnet winding 64 of the circuit controller 60 is effected across the contact 75 of the limit switch 76. Now the circuit controller 60 is energized so that its bridging elements 62 and 63 will close the following circuits: from the battery 80 across contacts 67 and 68 via bridging element 63 and wire 100 to the point 21a thence directly across the armature circuit of the motor 20 back to the battery via ground. From the point 21a current will also flow through the motor winding 21 thence through wire 101 across contacts 65 and 66 via the bridging element 62 thence through wire 102, motor field winding 22, wire 103 to the juncture point 104 and then through the heavy wire convolutions 41 back to the battery via ground. It will be noted that the fine wire convolutions 42 of the electromagnet winding 40 are not in circuit at the present time.

The above circuits render the motor 20 operative as a shunt motor and the electromagnet winding 41 effective to move the coupling 30 away from its braking element 33 into operative engagement with the driving disc 24 of the motor now being actuated in the opposite direction. The reverse rotation of the motor is effected by the flow of current through the winding 21 in a direction opposite that during the operation of the motor as a series motor previously described.

As the motor rotates the shaft 25 in this opposite direction the nut 26 will move downwardly to lower the load, permitting the contacts 72 of the limit switch 73 to again close. With the load upon the downwardly moving nut 26 there will be a tendency to accelerate the rotation of the shaft 25 in this direction. If such acceleration is not controlled, it would reach an undesirable and unsafe speed, causing damage to the mechanism. However, at a predetermined increased speed the motor 20, now driven by the loaded nut 26, will begin to function as a shunt generator, setting up counterelectromotive forces therein which will counteract driving efforts of the motor and cause the motor to act as a dynamo brake, thus controlling or more specifically resisting the turning effect of the loaded nut upon the shaft 25. When the nut 26 reaches a predetermined position in its downward movement it will engage limit switch 76 to open contacts 75 and thus render the circuit controller 60 inactive thereby breaking its circuits and consequently rendering the motor 20 inactive and the electromagnet winding 40 or particularly the section 41 thereof deenergized. This permits spring 32 to again return the coupling 30 into gripping engagement with the brake ring 33, preventing shaft rotation.

From the above description it will be seen that applicant has provided a load lifting device with control mechanism whereby the electric motor acting as a prime mover for the load lifting device functions as a powerful series motor concurrently with the energization of the electromagnet clutch to effect operation of the device to lift a heavy load and adapted to render the electric motor operative as a shunt motor concurrently with the energization of said electromagnet clutch, said shunt motor being capable of acting as a speed controlling dynamo brake in case the heavily loaded device reaches a predetermined excessive speed under the influence of the load being lowered.

While the embodiment of the present invention constitutes a preferred form, it is to be understood that other forms might be adopted, all coming within the scope of the claims which follow.

What is claimed is as follows:

1. In combination with an electric motor having an armature circuit and two field windings; a source of electric power; a member driven by the motor; a shaft; a stationary friction element, coupling means on the shaft normally engaging the friction element for preventing rotation of the shaft and adapted to be shifted into operative engagement with the motor driven member for rotating the shaft; an electromagnet having a winding adapted to be energized to shift the coupling means for connecting the motor driven member with the shaft; two circuit controlling switches, one adapted to be actuated to connect the source of power directly across the motor armature and the two motor field windings and a portion of the magnet winding in series with each other and in parallel with the armature circuit, the other switch, when actuated, connecting the source of power with the one motor winding in series with the armature circuit and also in series with the entire magnet winding; and a switch selectively operable to render one or the other of said control switches operative to complete its respective circuits.

2. In combination with an electric motor having an armature circuit and two field windings; a member driven by said motor; a shaft; a coupling slidably keyed to said shaft; friction means normally engaged by the coupling to prevent rotation of the shaft; a source of electric power; an electromagnet having a winding which, when energized, effects shifting of the coupling from the friction means into operative engagement with the motor driven member; and circuit controlling mechanisms selectively operable to connect the source of power with the motor to effect its operation in one direction or the other respectively, one of said mechanisms connecting the power source directly across the motor armature and also to the two motor field windings in series with each other and in series with a portion of the magnet winding whereby the motor operates in one direction as a shunt motor and the coupling connects the motor driven member with the shaft, the other of said mechanisms, when selectively operated, connecting the source of power with the one motor winding in series with the motor armature circuit and also in series with the entire magnet winding whereby the motor operates in the other direction as a series motor and the coupling operatively engages the motor driven member.

3. In combination with an electric motor having an armature circuit and two field windings; a source of electric power; a member driven by the motor; a shaft; a stationary braking element; a coupling slidably keyed to the shaft normally engaging the braking element to prevent shaft rotation and adapted to be moved from said element into operative engagement with the motor driven member; an electromagnet having a magnet winding comprising a series of heavy and fine wire convolutions connected in series, said electromagnet, when energized, being adapted to shift the coupling from its braking position into operative engagement with the motor driven member; a magnet-switch for connecting the source of power directly across the armature of the motor and with the two field windings and the heavy wire convolutions of the electromagnet, all in series with each other and in parallel with the armature circuit, for effecting operation of the motor in one direction; a magnet switch for connecting the source of power with the one motor field winding in series with the armature circuit and also in series with both heavy and fine windings of the electromagnet to effect motor operation in the opposite direction; and a selector switch for rendering one or the other magnet switches effective to close its respective circuits.

4. In combination with an electric motor having an armature circuit and two field windings; a source of electric power; a member driven by the motor; a shaft; an electromagnetic clutch having a magnet coil comprising two connected sets of convolutions, one of low, the other of high resistance wire, said coil, when energized, causing the shaft to be connected to the motor driven member; two magnet switches, and means for connecting the source of power with one or the other of said magnet switches for actuating it, the actuation of the one magnet switch connecting the source of power directly across the motor armature and the two field windings in series with each other and with the low resistance winding of the electromagnetic clutch, the two field windings and the clutch winding being in parallel with the armature circuit, the actuation of the other magnet switch completing two parallel circuits, one including only one of the two motor field windings in series with the motor armature, the other circuit including said one motor field winding in series with both high and low resistance windings of the magnetic clutch coil.

ROBERT WILLIAM LELAND.